United States Patent
D'Souza et al.

(10) Patent No.: US 10,775,065 B2
(45) Date of Patent: Sep. 15, 2020

(54) AIR CONDITIONING SYSTEM INCLUDING A REHEAT LOOP

(71) Applicant: Haier US Appliance Solutions, Inc., Wilmington, DE (US)

(72) Inventors: Bryan Isaac D'Souza, Louisville, KY (US); Richard Dustin Henderson, LaGrange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 207 days.

(21) Appl. No.: 15/947,901

(22) Filed: Apr. 9, 2018

(65) Prior Publication Data

US 2019/0309976 A1   Oct. 10, 2019

(51) Int. Cl.
| | |
|---|---|
| F25D 17/06 | (2006.01) |
| F24F 11/54 | (2018.01) |
| F24F 1/0029 | (2019.01) |
| F25B 49/02 | (2006.01) |
| F28D 15/04 | (2006.01) |

(52) U.S. Cl.
CPC ............ *F24F 11/54* (2018.01); *F24F 1/0029* (2013.01); *F25B 49/027* (2013.01); *F28D 15/043* (2013.01); *F25B 2313/0294* (2013.01); *F25B 2313/02334* (2013.01); *F25B 2313/0314* (2013.01)

(58) Field of Classification Search
CPC .. F24F 11/54; F24F 11/83; F24F 11/86; F24F 11/871; F24F 1/0029; F25B 5/02; F25B 49/02; F25B 49/027; F25B 2313/02334; F25B 2313/0294; F25B 2313/0314; F25B 2600/0253; F25B 2600/11; F25B 2600/2511; F25B 2600/2513; F25B 2700/21162; F25B 2700/21163; F25B 2700/21174; F25B 2700/21175; F25B 2700/2103; F25B 2700/2116; F25B 2700/21161; F25B 2700/2117; F25B 2700/21171; F28D 15/043
See application file for complete search history.

(56) References Cited

U.S. PATENT DOCUMENTS

| | | | |
|---|---|---|---|
| 7,062,930 B2 * | 6/2006 | Rayburn | F24F 3/153 62/173 |
| 7,165,414 B2 * | 1/2007 | Wright | F24F 3/153 62/277 |
| 9,638,443 B2 | 5/2017 | Shimazu et al. | |

FOREIGN PATENT DOCUMENTS

| | | |
|---|---|---|
| EP | 2636961 A1 | 11/2013 |
| JP | 4239261 B2 | 3/2009 |

* cited by examiner

*Primary Examiner* — Henry T Crenshaw
*Assistant Examiner* — Kamran Tavakoldavani
(74) *Attorney, Agent, or Firm* — Dority & Manning, P.A.

(57) ABSTRACT

An air conditioning system and a method of operating the same to improve system performance is provided. The air conditioning system includes an outdoor heat exchanger, an indoor heat exchanger, and a reheat heat exchanger. A reheat temperature sensor positioned proximate an upstream end of the reheat heat exchanger in a cooling mode for measuring a reheat coil saturation temperature. A controller adjusts at least one operating parameter, such as a compressor or fan speed, in response to the reheat coil saturation temperature and/or one of an outdoor coil vapor temperature, an indoor coil vapor temperature, an outdoor coil saturation temperature, and an indoor coil saturation temperature.

20 Claims, 3 Drawing Sheets

US 10,775,065 B2

AIR CONDITIONING SYSTEM INCLUDING A REHEAT LOOP

FIELD OF THE INVENTION

The present disclosure relates generally to air conditioning systems, and more particularly to air conditioners having reheat loops.

BACKGROUND OF THE INVENTION

Air conditioning systems are conventionally utilized to condition air within an indoor space—i.e., to adjust the temperature and humidity of the air within structures such as dwellings and office buildings. Such systems commonly include a closed refrigeration loop to condition the indoor air which is recirculated while being heated or cooled. Certain refrigeration loops include an outdoor heat exchanger positioned outdoors, an indoor heat exchanger positioned indoors, and tubing or conduit for circulating a flow of refrigerant through the heat exchangers to facilitate heat transfer.

When the air within the indoor space is humid, it may be desirable to remove moisture from the air. Air conditioning systems typically dehumidify air by passing the humid air over an indoor heat exchanger that has cool refrigerant passing through its coils. As the humid air passes through the indoor heat exchanger and crosses over its refrigerant cooled coils, the coils pull moisture from the air by lowering the temperature of the air and causing moisture in the air to condense on the coils. The dehumidified air is then passed into the indoor space at a lower temperature and humidity.

However, in certain situations, such as when it is cool and humid outside, such a dehumidification process may lower the temperature of indoor air below the target temperature of the indoor space. Certain air conditioning systems use electric heaters to heat the indoor air downstream of the indoor heat exchanger. However, such electric heaters are costly and decrease the energy efficiency of the air conditioning system.

Therefore, certain air conditioning systems include an additional heat exchanger that can be throttled to pass hot refrigerant through its coils to reheat the overcooled air. However, the ability to monitor system parameters and the reheat process in general is limited, thereby reducing the reheat system performance and consumer satisfaction.

Accordingly, improved air conditioning systems with features for removing humidity from indoor air without cooling the air below the target indoor temperature would be useful.

BRIEF DESCRIPTION OF THE INVENTION

Aspects and advantages of the invention will be set forth in part in the following description, may be obvious from the description, or may be learned through practice of the invention.

In accordance with one embodiment, an air conditioning system includes a refrigeration loop including an outdoor heat exchanger positioned within an outdoor portion, a reheat heat exchanger positioned within an indoor portion, and an indoor heat exchanger positioned within the indoor portion. A compressor is operably coupled to the refrigeration loop and is configured for urging a flow of refrigerant through the outdoor heat exchanger, the reheat heat exchanger, and the indoor heat exchanger. A reheat temperature sensor is positioned between an upstream end and a midpoint of the reheat heat exchanger in a cooling mode, the reheat temperature sensor being configured for measuring a reheat coil saturation temperature. A controller is configured for adjusting at least one operating parameter of the air conditioning system in response to the reheat coil saturation temperature.

In accordance with another embodiment, a method of regulating the operation of an air conditioning system is provided. The air conditioning system includes an outdoor heat exchanger positioned within an outdoor portion, a reheat heat exchanger positioned within an indoor portion, and an indoor heat exchanger positioned within the indoor portion. The method includes obtaining a reheat coil saturation temperature using a reheat temperature sensor positioned proximate an upstream end of the reheat heat exchanger in a cooling mode; obtaining an outdoor coil vapor temperature using an outdoor vapor temperature sensor positioned proximate an upstream end of the outdoor heat exchanger in the cooling mode; and obtaining an indoor coil vapor temperature using an indoor vapor temperature sensor positioned between the upstream end of the indoor heat exchanger and a downstream end of the indoor heat exchanger in the cooling mode. The method further includes selectively operating a compressor, an electronic expansion valve, an indoor fan, or an outdoor fan in response to the reheat coil saturation temperature, the outdoor coil vapor temperature, and the indoor coil vapor temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
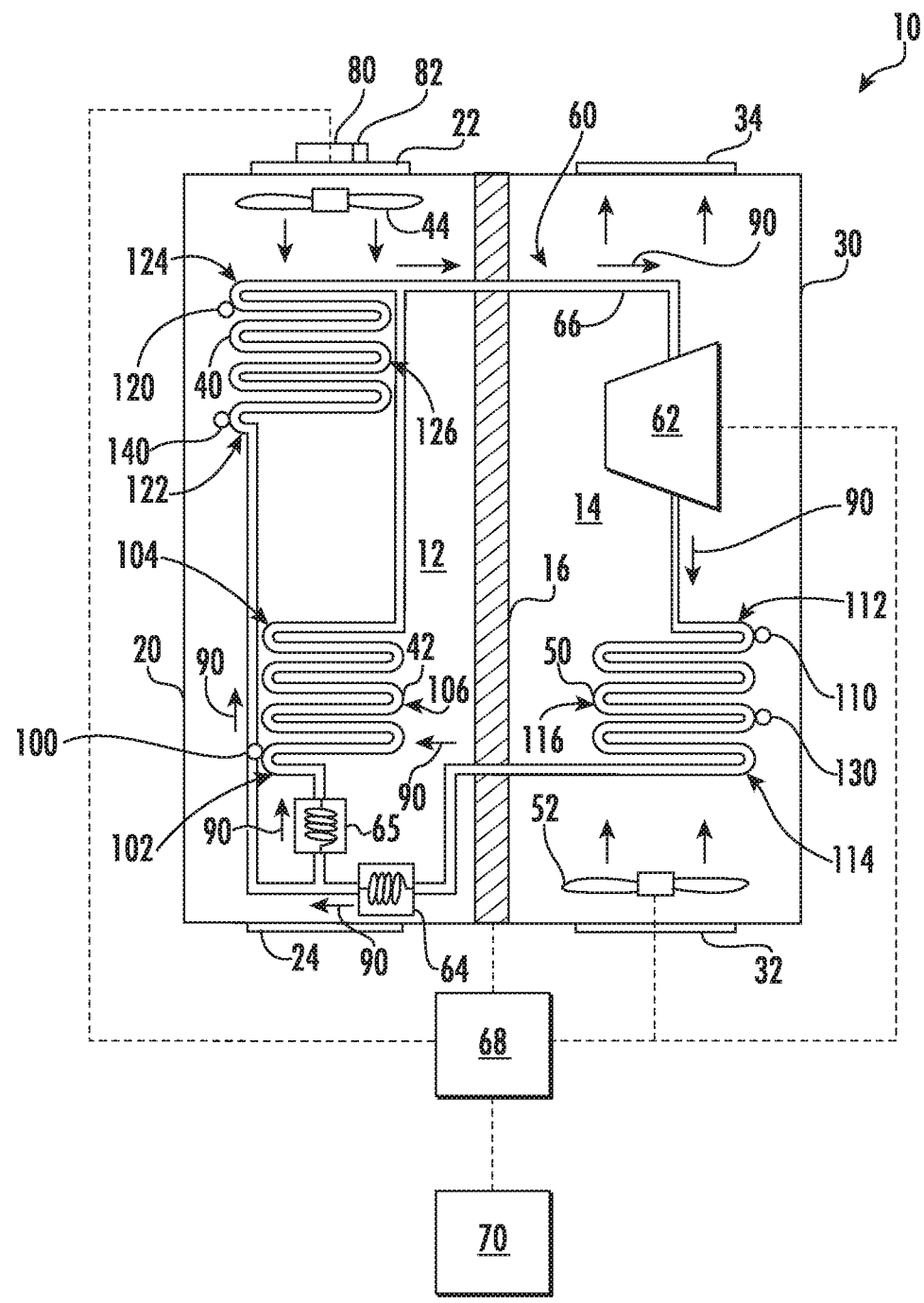
FIG. 1 provides a schematic view of an air conditioning system in accordance with one exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an air conditioning system 10 is provided. The system 10 includes an indoor portion 12 and an outdoor portion 14 separated by a partition 16, such as a wall. Although indoor portion 12 and outdoor portion 14 are illustrated as being adjacent to each other and separated by partition 16, it should be appreciated that this is only one exemplary embodiment. According to alternative embodiments, indoor portion 12 and outdoor portion 14 may be positioned separate from each other and connected by extended lengths of tubing or conduit.

Indoor portion 12 of air conditioning system 10 may generally define an indoor air duct 20 through which indoor air may be circulated for conditioning. More specifically, indoor air duct 20 may define an indoor return vent 22 for drawing a flow of indoor air into system 10 and an indoor supply vent 24 positioned downstream of indoor return vent 22 for supplying conditioned indoor air back into the room. It should be appreciated that the terms "upstream" and "downstream" refer to the relative direction with respect to fluid flow in a fluid pathway. For example, "upstream" refers to the direction from which the fluid flows, and "downstream" refers to the direction to which the fluid flows.

Similarly, outdoor portion 14 of air conditioning system 10 may generally define an outdoor air duct 30 through which outdoor air may be passed, e.g., for discharging thermal energy to the ambient environment. More specifically, outdoor air duct 30 may define an inlet 32 for drawing a flow of ambient air into system 10 and an outlet 34 positioned downstream of inlet 32 for discharging outdoor air from system 10.

Air conditioning system 10 includes an indoor heat exchanger 40 and a reheat heat exchanger 42 which are positioned within indoor duct 20 between indoor return vent 22 and indoor supply vent 24. In addition, an indoor fan 44 is in fluid communication with indoor duct 20 for urging a flow of air through indoor heat exchanger 40 and reheat heat exchanger 42. In addition, air conditioning system 10 includes an outdoor heat exchanger 50 which is positioned within outdoor duct 30 between inlet 32 and outlet 34. An outdoor fan 52 is in fluid communication with outdoor duct 30 for urging a flow of air through outdoor heat exchanger 50.

Heat exchangers 40, 42, and 50 may be components of a refrigeration loop 60, which is shown schematically in FIG. 1. Refrigeration loop 60 may, for example, further include a compressor 62 and expansion device(s) 64, 65. As illustrated, compressor 62 and expansion devices 64, 65 may be in fluid communication with indoor heat exchanger 40, reheat heat exchanger 42, and outdoor heat exchanger 50 to flow refrigerant through refrigeration loop 60 as is generally understood. More particularly, refrigeration loop 60 may include various lines or conduit 66 for flowing refrigerant between the various components of refrigeration loop 60, thus providing the fluid communication there between.

According to the illustrated embodiment, compressor 62 is in direct fluid communication with the outdoor heat exchanger 50. In this manner, compressor 62 and outdoor heat exchanger 50 are directly connected through a piece of conduit 66 such that no devices or components are positioned between them. In addition, a first expansion device 64 is positioned on refrigeration loop 60 immediately downstream of outdoor heat exchanger 50 (e.g., within indoor portion 12). Indoor heat exchanger 40 and reheat heat exchanger 42 may be plumbed in parallel downstream of first expansion device 64. In this manner, expansion device 64 may selectively throttle the refrigerant passing into both indoor heat exchanger 40 and reheat heat exchanger 42.

In addition, a second expansion device 65 may be positioned just upstream of reheat heat exchanger 42 in the cooling mode to provide independent throttling of the refrigerant flowing through reheat heat exchanger 42. The refrigerant that passes through indoor heat exchanger 40 and reheat heat exchanger 42 may be merged downstream of these heat exchangers, e.g., prior to passing back into outdoor portion 14 and being compressed in compressor 62. Thus, in a cooling mode of operation, refrigerant flows through the connecting conduit 66 from compressor 62 to outdoor heat exchanger 50, from outdoor heat exchanger 50 to first expansion device 64, from first expansion device 64 into parallel conduits 66 feeding indoor heat exchanger 40 and reheat heat exchanger 42, respectively, and then merge downstream of indoor heat exchanger 40 and reheat heat exchanger 42 before returning to compressor 62.

The refrigerant may generally undergo phase changes associated with a refrigeration cycle as it flows to and through these various components, as is generally understood. Suitable refrigerants for use in refrigeration loop 60 may include pentafluoroethane, difluoromethane, or a mixture such as R410a, although it should be understood that the present disclosure is not limited to such example and rather that any suitable refrigerant may be utilized.

As is understood in the art, refrigeration loop 60 may be alternately be operated as a refrigeration assembly (and thus perform a refrigeration cycle) or a heat pump (and thus perform a heat pump cycle). When refrigeration loop 60 is operating in a cooling mode and thus performs a refrigeration cycle, the indoor heat exchanger 40 and reheat heat exchanger 42 act as evaporators and the outdoor heat exchanger 50 acts as a condenser. Alternatively, when the assembly is operating in a heating mode and thus performs a heat pump cycle, the indoor heat exchanger 40 and reheat heat exchanger 42 act as condensers and the outdoor heat exchanger 50 acts as an evaporator. The indoor heat exchanger 40, the reheat heat exchanger 42, and the outdoor heat exchanger 50 may each include coils through which a refrigerant may flow for heat exchange purposes, as is generally understood.

According to an example embodiment, compressor 62 may be a variable speed compressor. In this regard, compressor 62 may be operated at various speeds depending on the current air conditioning needs of the room and the demand from refrigeration loop 60. For example, according to an exemplary embodiment, compressor 62 may be configured to operate at any speed between a minimum speed, e.g., 1500 revolutions per minute (RPM), to a maximum rated speed, e.g., 3500 RPM. Notably, use of variable speed compressor 62 enables efficient operation of refrigeration loop 60 (and thus air conditioning system 10), minimizes unnecessary noise when compressor 62 does not need to operate at full speed, and ensures a comfortable environment within the room.

In exemplary embodiments as illustrated, expansion device 64, 65 may be electronic expansion valves that enable controlled expansion of refrigerant, as is known in the art. More specifically, electronic expansion devices 64, 65 may be configured to precisely control the expansion of the refrigerant to maintain, for example, a desired temperature differential of the refrigerant across the indoor heat exchanger 40 and/or reheat heat exchanger 42. In other words, electronic expansion devices 64, 65 throttles the flow of refrigerant based on the reaction of the temperature differential across these heat exchangers or the amount of superheat temperature differential, thereby ensuring that the refrigerant is in the gaseous state entering compressor 62. According to alternative embodiments, expansion device 64 may be a capillary tube or another suitable expansion device configured for use in a thermodynamic cycle.

According to the illustrated exemplary embodiment, indoor fan 44 and outdoor fan 52 are illustrated as axial fans. However, it should be appreciated that according to alternative embodiments, indoor fan 44 and outdoor fan 52 may be any suitable fan type. For example, one or both of indoor fan 44 and outdoor fan 52 may be centrifugal fans. In addition, according to an exemplary embodiment, indoor fan 44 and outdoor fan 52 are variable speed fans and may rotate at different rotational speeds to generate different air flow rates. It may be desirable to operate indoor fan 44 and outdoor fan 52 at less than their maximum rated speed to ensure safe and proper operation of refrigeration loop 60 at less than its maximum rated speed, e.g., to reduce noise when full speed operation is not needed.

According to the illustrated embodiment, indoor fan 44 may be positioned upstream of indoor heat exchanger 40 along the flow direction of indoor air and outdoor fan 52 may be positioned upstream of outdoor heat exchanger 50 along the flow direction of outdoor air. Alternatively, indoor fan 44 and outdoor fan 52 may be positioned downstream of indoor heat exchanger 40 and outdoor heat exchanger 50 for urging flows of air through the indoor duct 20 and outdoor duct 30, respectively.

The operation of air conditioning system 10 including compressor 62 (and thus refrigeration loop 60 generally), indoor fan 44, outdoor fan 52, expansion devices 64, 65, and other components of refrigeration loop 60 may be controlled by a processing device such as a controller 68. Controller 68 may be in communication (via for example a suitable wired or wireless connection) to such components of the air conditioning system 10. By way of example, the controller 68 may include a memory and one or more processing devices such as microprocessors, CPUs or the like, such as general or special purpose microprocessors operable to execute programming instructions or micro-control code associated with operation of system 10. The memory may represent random access memory such as DRAM, or read only memory such as ROM or FLASH. In one embodiment, the processor executes programming instructions stored in memory. The memory may be a separate component from the processor or may be included onboard within the processor.

System 10 may additionally include a control panel 70 and one or more user inputs, which may be included in control panel 70. The user inputs may be in communication with the controller 68. A user of the system 10 may interact with the user inputs to operate the system 10, and user commands may be transmitted between the user inputs and controller 68 to facilitate operation of the system 10 based on such user commands. A display may additionally be provided in control panel 70, and may be in communication with the controller 68. The display may, for example be a touchscreen or other text-readable display screen, or alternatively may simply be a light that can be activated and deactivated as required to provide an indication of, for example, an event or setting for the system 10.

Air conditioning system 10 may further include one or more sensors used to facilitate operation of system 10. For example, sensors may be used for measuring the temperature, pressure, humidity, or other conditions at any suitable locations within system 10 or in the ambient environment. According to the illustrated embodiment, system 10 includes an indoor air temperature sensor 80 positioned within indoor portion 12 or within the room being conditioned.

As illustrated, indoor air temperature sensor 80 is positioned downstream of indoor heat exchanger 40 and reheat heat exchanger 42. More specifically, for example, indoor air temperature sensor 80 may be positioned proximate indoor supply vent 24. However, it should be appreciated that according to alternative embodiments, indoor air temperature sensor 80 may be positioned at any location suitable for detecting the temperature of dehumidified and reheated air to be supplied to the room. Indoor air temperature sensor 80 may generally be used to improve performance of air conditioning system 10, e.g., by controlling the operation of outdoor fan 52 to control the amount of thermal reheat energy passed back into the reheat heat exchanger 42.

In addition, air conditioning system 10 may include one or more indoor air humidity sensors 82. In this regard, for example, system 10 can be configured for performing a dehumidification operation when the humidity of the indoor air is above a predetermined threshold. In addition, outdoor fan 52 can be controlled in response to both a humidity measurement by indoor air humidity sensor 82 and a temperature measurement by indoor air temperature sensor 80. According to the illustrated embodiment, indoor air humidity sensor 82 is positioned proximate indoor return vent 22 for measuring the humidity of return air or room air. However, indoor air humidity sensor 82 may be positioned in different locations according to alternative embodiments.

In addition to air temperature and humidity sensors, air conditioning system 10 may further include temperature sensors operably coupled to refrigeration loop 60 for monitoring its operation. For example, referring again specifically to FIG. 1, air conditioning system 10 includes a plurality of refrigerant temperature sensors mounted to or otherwise in thermal communication with various suitable locations on refrigeration loop 60 for obtaining refrigerant temperatures at those locations.

As described herein, "temperature sensor" may refer to any suitable type of temperature sensor. For example, the temperature sensors may be thermocouples, thermistors, or resistance temperature detectors. In addition, the temperature sensors may be mounted at any suitable location and in any suitable manner for obtaining a desired temperature, either directly or indirectly. Although exemplary positioning of certain temperature sensors are described below, it should be appreciated that air conditioning system 10 may include any other suitable number, type, and position of temperature sensors according to alternative embodiments.

As will be explained in more detail below, knowledge of the refrigerant temperature at particular locations may be advantageously used to improve system performance and operation. Therefore, the refrigerant temperature sensors are generally used to improve performance of air conditioning system 10, e.g., by providing temperature feedback that may be used to ensure that refrigerant is in a desired state or has a desired temperature at particular points within refrigeration loop 60.

Figure 2:
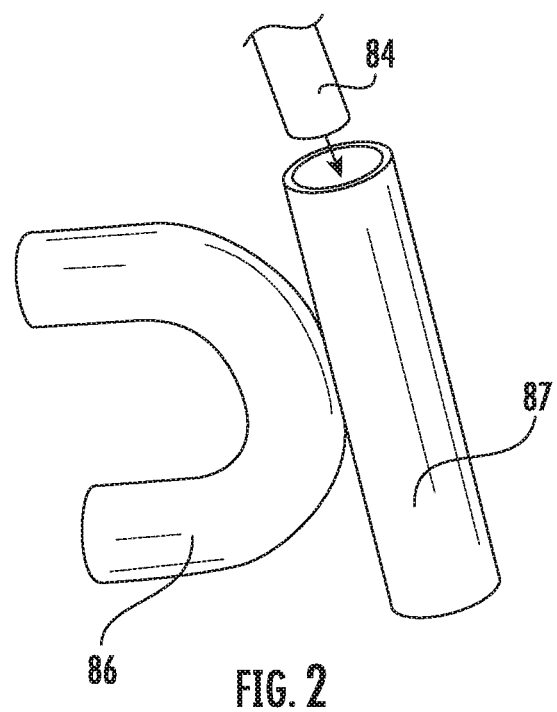
FIG. 2 provides a mounting method of a temperature measurement device according to an exemplary embodiment of the present subject matter.
Figure 3:
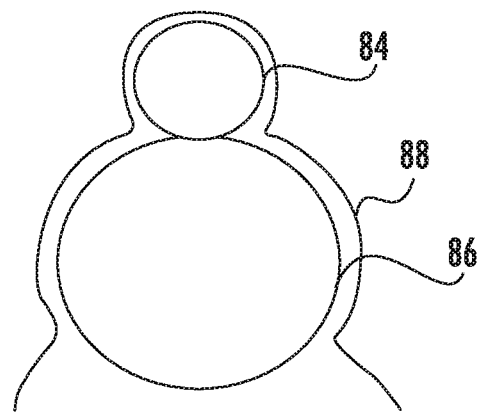
FIG. 3 provides a mounting method of a temperature measurement device according to another exemplary embodiment of the present subject matter.

Referring briefly to FIGS. 2 and 3, an exemplary means for attaching a refrigerant temperature sensor 84 to a heat exchanger coil or conduit 86 for transporting refrigerant will be described according to an exemplary embodiment. Specifically, as shown in FIG. 2, temperature sensor 84 may be attached to a bend in refrigerant conduit 86, e.g., by placing it inside a temperature sensor holder or well 87 that is attached to conduit 86. By contrast, as shown in FIG. 3, temperature sensor 84 may be directly coupled to a straight segment of conduit 86 using a resilient sensor clip 88. In this regard, resilient sensor clip 88 is a resilient metal clip that extends around both refrigerant temperature sensor 84 and refrigerant conduit 86 to maintain thermal contact between the two. Although one exemplary clip is illustrated, it should be appreciated that any suitable mechanism for attaching temperature sensor 84 to refrigerant conduit 86 may be used according to alternative embodiments.

Referring again to FIG. 1, the position of various refrigerant temperature sensors will be described according to an exemplary embodiment. In order to simplify the explanation of the position of various temperature sensors below, the terms "upstream" and "downstream" are used to refer to ends or regions of the various heat exchangers. Notably, in a bi-directional system as described above, the direction of the flow of refrigerant dictates what is considered upstream and downstream. Therefore, the naming conventions below assume air conditioning system 10 is operating in a "cooling" mode, e.g., such that a flow of refrigerant (indicated by arrows 90) passes from compressor 62 directly to outdoor heat exchanger 50 before passing to indoor portion 12.

In addition, the term "end" is used to refer to a location on the respective heat exchanger where the heat exchange coil couples to the fluid conduit that passes to the next heat exchanger or system component (e.g., the coil-conduit transition point). In addition, it should be appreciated that as used herein, terms of approximation, such as "approximately," "substantially," or "about," refer to being within a ten percent margin of error. Furthermore, the term "proximate" may be used herein to refer to being located at the specific location or within a distance of that location that is less than 10% percent of a total length of the respective heat exchanger.

As used herein the refrigerant "saturation temperature" is intended to refer to the temperature at which the refrigerant changes from a liquid state to a vapor state (i.e., its boiling point). In addition, the refrigerant "vapor temperature" is intended to refer the temperature of the refrigerant vapor (i.e., the refrigerant in a gaseous state). For example, the superheat of a refrigerant may be determined by subtracting the saturation temperature of the refrigerant from the vapor temperature of the refrigerant at a particular point in the system.

As shown, air conditioning system 10 includes a reheat temperature sensor 100 which is generally configured for measuring a reheat coil saturation temperature of the flow of refrigerant 90 within refrigeration loop 60. Reheat temperature sensor 100 is generally positioned upstream of or on reheat heat exchanger 42. More specifically, reheat heat exchanger 42 defines an upstream end 102 where the flow of refrigerant 90 enters reheat heat exchanger 42 and a downstream end 104 where the flow of refrigerant 90 exits reheat heat exchanger 42. A midpoint 106 is defined at a location halfway between upstream end 102 and downstream end 104. According to an exemplary embodiment, reheat temperature sensor 100 is positioned between upstream end 102 and a midpoint 106 of reheat heat exchanger 42 in the cooling mode. More specifically, as illustrated, reheat temperature sensor 100 is positioned proximate upstream end 102.

Air conditioning system 10 may further include an outdoor vapor temperature sensor 110 which is generally configured for measuring an outdoor coil vapor temperature of the flow of refrigerant 90 within refrigeration loop 60. Outdoor vapor temperature sensor 110 is generally positioned upstream of or on outdoor heat exchanger 50. More specifically, outdoor heat exchanger 50 defines an upstream end 112 where the flow of refrigerant 90 enters outdoor heat exchanger 50 and a downstream end 114 where the flow of refrigerant 90 exits outdoor heat exchanger 50. A midpoint 116 is defined at a location halfway between upstream end 112 and downstream end 114. According to an exemplary embodiment, outdoor vapor temperature sensor 110 is positioned between upstream end 112 and a midpoint 116 of outdoor heat exchanger 50 in the cooling mode. More specifically, as illustrated, outdoor vapor temperature sensor 110 is positioned proximate upstream end 112.

Air conditioning system 10 may further include an indoor vapor temperature sensor 120 which is generally configured for measuring an indoor coil vapor temperature of the flow of refrigerant 90 within refrigeration loop 60. Indoor vapor temperature sensor 120 is generally positioned somewhere on indoor heat exchanger 40 or just downstream of indoor heat exchanger 40 in the cooling mode. More specifically, indoor heat exchanger 40 defines an upstream end 122 where the flow of refrigerant 90 enters indoor heat exchanger 40 and a downstream end 124 where the flow of refrigerant 90 exits indoor heat exchanger 40. A midpoint 126 is defined at a location halfway between upstream end 122 and downstream end 124. According to an exemplary embodiment, indoor vapor temperature sensor 120 is positioned between upstream end 122 (of indoor heat exchanger 40) and downstream end 124 of indoor heat exchanger 40 in the cooling mode. More specifically, as illustrated, indoor vapor temperature sensor 120 is positioned proximate downstream end 124 of indoor heat exchanger 40.

Air conditioning system 10 may further include an outdoor saturation temperature sensor 130 which is generally configured for measuring an outdoor coil saturation temperature of the flow of refrigerant 90 within refrigeration loop 60. Outdoor saturation temperature sensor 130 is generally positioned somewhere on outdoor heat exchanger 50. More specifically, according to an exemplary embodiment, outdoor saturation temperature sensor 130 is positioned between upstream end 112 and downstream end 114 of outdoor heat exchanger 50 in the cooling mode. More specifically, as illustrated, outdoor saturation temperature sensor 130 is positioned proximate midpoint 116 of outdoor heat exchanger 50.

Air conditioning system 10 may further include an indoor saturation temperature sensor 140 which is generally configured for measuring an indoor coil saturation temperature of the flow of refrigerant 90 within refrigeration loop 60. Indoor saturation temperature sensor 140 is generally positioned somewhere on indoor heat exchanger 40. More specifically, according to an exemplary embodiment, indoor saturation temperature sensor 140 is positioned between upstream end 122 and downstream end 124 of indoor heat exchanger 40 in the cooling mode. More specifically, as illustrated, indoor saturation temperature sensor 140 is positioned proximate upstream end 122 of indoor heat exchanger 40.

It should be appreciated that air conditioning system 10 is described herein only for the purpose of explaining aspects of the present subject matter. For example, air conditioning system 10 is used herein to describe exemplary configurations of refrigerant temperature sensors on refrigeration loop 60 to facilitate control of system 10. It should be appreciated that aspects of the present subject matter may be used to operate air conditioning systems having different types of heat exchangers and various different or additional components. Thus, the exemplary components and methods described herein are used only to illustrate exemplary aspects of the present subject matter and are not intended to limit the scope of the present disclosure in any manner.

Now that the construction and configuration of air conditioning system 10 according to an exemplary embodiment of the present subject matter has been presented, an exemplary method 200 for operating an air conditioning system according to an exemplary embodiment of the present subject matter is provided. Method 200 can be used to operate air conditioning system 10, or any other suitable air conditioning system. In this regard, for example, controller 68 may be configured for implementing method 200. However, it should be appreciated that the exemplary method 200 is discussed herein only to describe exemplary aspects of the present subject matter, and is not intended to be limiting.

In general terms, method 200 includes obtaining the temperature of the flow of refrigerant 90 passing through refrigerant loop 60 at various locations and selectively operating air conditioning system 10 in response to such temperature measurements. In this regard, as explained below, a controller (such as controller 68) is used to adjust at least one operating parameter of air conditioning system 10 in response to one or more refrigerant temperature measurements of other system conditions. Although operating parameters are described herein as being adjusted "in response to" specific, absolute temperature measurements, it should be appreciated that operating parameter adjustments may also be made in response to differences between certain refrigerant temperatures, e.g., such as when the difference is measured directly using a thermocouple having leads coupled to two different refrigerant locations.

As used herein, an "operating parameter" of air conditioning system 10 is any component setting, speed, configuration, or other operating characteristic that may affect the performance of air conditioning system 10. Thus, references to operating parameter adjustments or "adjusting at least one operating parameter" are intended to refer to control actions intended to improve system performance in response to refrigerant temperature measurements. In this regard, for example, adjusting an operating parameter may include adjusting a speed of compressor 62, indoor fan 44, outdoor fan 52, or operation of expansion devices 64, 65. Other operating parameter adjustments are possible and within the scope of the present subject matter.

Figure 4:
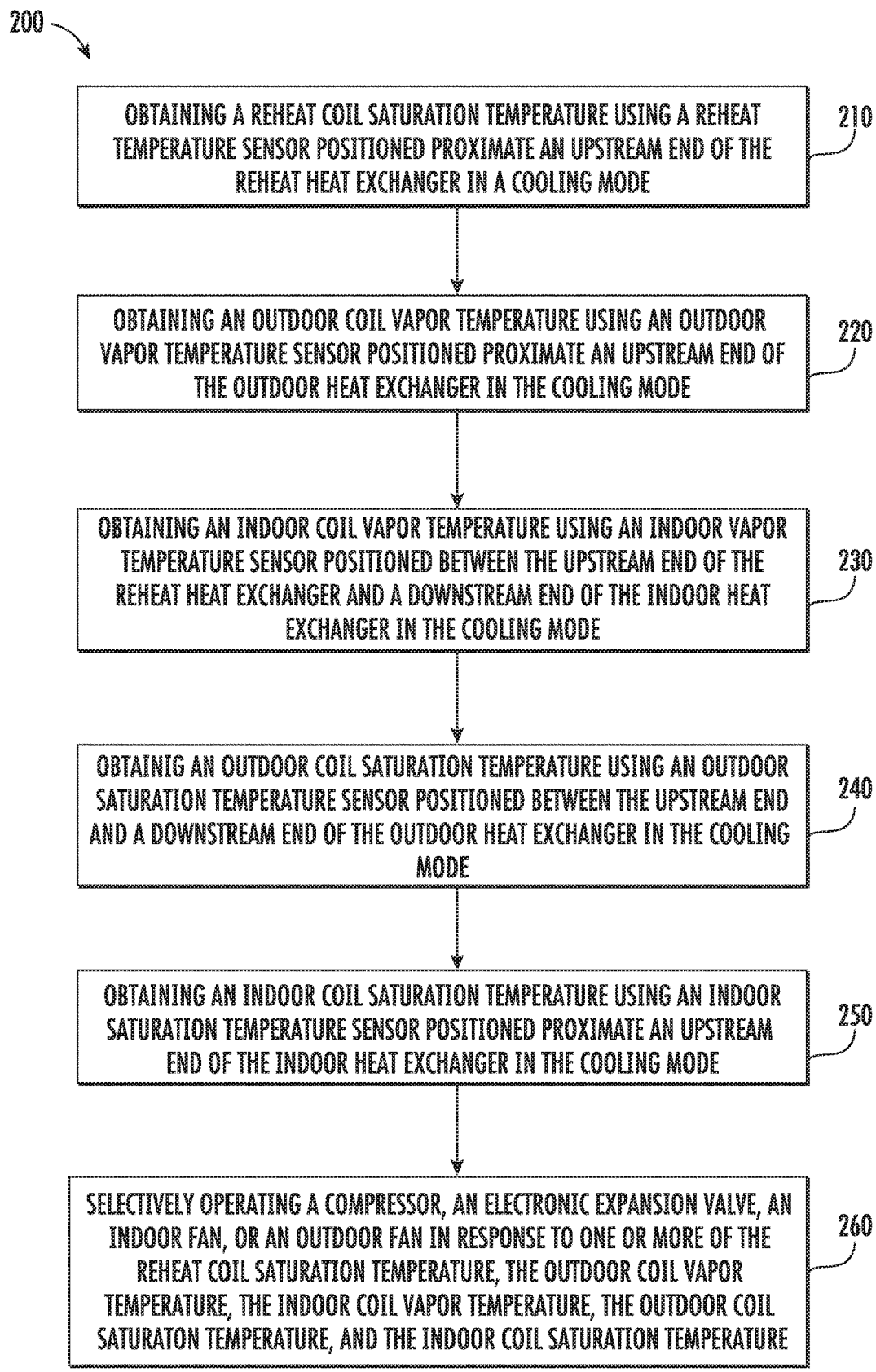
FIG. 4 is a method of operating an air conditioning system in accordance with one embodiment of the present disclosure.

Referring now to FIG. 4, method 200 includes, at step 210, obtaining a reheat coil saturation temperature using a reheat temperature sensor (such as 100) positioned proximate an upstream end of the reheat heat exchanger in a cooling mode. Step 220 includes obtaining an outdoor coil vapor temperature using an outdoor vapor temperature sensor (such as 110) positioned proximate an upstream end of the outdoor heat exchanger in the cooling mode. Step 230 includes obtaining an indoor coil vapor temperature using an indoor vapor temperature sensor (such as 120) positioned on the indoor heat exchanger in the cooling mode. Step 240 includes obtaining an outdoor coil saturation temperature using an outdoor saturation temperature sensor (such as 130) positioned between the upstream end and a downstream end of the outdoor heat exchanger in the cooling mode. Step 250 includes obtaining an indoor coil saturation temperature using an indoor saturation temperature sensor (such as 140) positioned proximate an upstream end of the indoor heat exchanger in the cooling mode.

After the temperature measurements are obtained in steps 210-250, step 260 includes selectively operating a compressor, an electronic expansion valve, an indoor fan, or an outdoor fan in response to one or more of the reheat coil saturation temperature, the outdoor coil vapor temperature, the indoor coil vapor temperature, the outdoor coil saturation temperature, and the indoor coil saturation temperature. As explained above, regulating operation of the air conditioning system using the compressor, the electronic expansion valve, the indoor fan, or the outdoor fan are only exemplary operating parameter adjustments. In addition, any suitable combination of the above reference temperatures may be used by a system controller for making such control determinations. The exemplary embodiment described herein is not intended to limit the scope of the present subject matter.

FIG. 4 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using air conditioning system 10 as an example, it should be appreciated that these methods may be applied to the operation of any suitable air conditioner type and configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioning system comprising:
a refrigeration loop comprising an outdoor heat exchanger positioned within an outdoor portion, a reheat heat exchanger positioned within an indoor portion, and an indoor heat exchanger positioned within the indoor portion;
a compressor operably coupled to the refrigeration loop and being configured for urging a flow of refrigerant through the outdoor heat exchanger, the reheat heat exchanger, and the indoor heat exchanger;
a reheat temperature sensor positioned between an upstream end and a midpoint of the reheat heat exchanger in a cooling mode, the reheat temperature sensor being configured for measuring a reheat coil saturation temperature; and
a controller configured for adjusting at least one operating parameter of the air conditioning system in response to the reheat coil saturation temperature.

2. The air conditioning system of claim 1, wherein the reheat temperature sensor is positioned proximate the upstream end of the reheat heat exchanger in the cooling mode.

3. The air conditioning system of claim 1, further comprising:
an outdoor vapor temperature sensor positioned between an upstream end and a midpoint of the outdoor heat exchanger, the outdoor vapor temperature sensor being configured for measuring an outdoor coil vapor temperature.

4. The air conditioning system of claim 3, wherein the outdoor vapor temperature sensor is positioned proximate an upstream end of the outdoor heat exchanger in the cooling mode.

5. The air conditioning system of claim 3, wherein the controller is configured for adjusting at least one operating parameter of the air conditioning system in response to both the outdoor coil saturation temperature and the outdoor coil vapor temperature.

6. The air conditioning system of claim 1, further comprising:
an indoor vapor temperature sensor positioned on the indoor heat exchanger in the cooling mode, the indoor vapor temperature sensor being configured for measuring an indoor coil vapor temperature.

7. The air conditioning system of claim 6, wherein the indoor vapor temperature sensor is positioned proximate the downstream end of the indoor heat exchanger in the cooling mode.

8. The air conditioning system of claim 6, wherein the controller is configured for adjusting at least one operating parameter of the air conditioning system in response to both the indoor coil saturation temperature and the indoor coil vapor temperature.

9. The air conditioning system of claim 1, further comprising:
an outdoor saturation temperature sensor positioned between an upstream end and a downstream end of the outdoor heat exchanger in the cooling mode, the outdoor saturation temperature sensor being configured for measuring an outdoor coil saturation temperature.

10. The air conditioning system of claim 9, wherein the outdoor heat exchanger defines a midpoint halfway between the upstream end and the downstream end of the outdoor heat exchanger, wherein the outdoor saturation temperature sensor is positioned proximate the midpoint.

11. The air conditioning system of claim 9, wherein the controller is configured for adjusting at least one operating parameter of the air conditioning system in response to both the reheat coil saturation temperature and the outdoor coil vapor temperature.

12. The air conditioning system of claim 1, further comprising:
an indoor saturation temperature sensor positioned between an upstream end and the midpoint of the indoor heat exchanger, the indoor saturation temperature sensor being configured for measuring an indoor coil saturation temperature.

13. The air conditioning system of claim 12, wherein the indoor saturation temperature sensor is positioned proximate the upstream end of the indoor heat exchanger in the cooling mode.

14. The air conditioning system of claim 12, wherein the controller is configured for adjusting at least one operating parameter of the air conditioning system in response to both the reheat coil saturation temperature and the indoor coil vapor temperature.

15. The air conditioning system of claim 1, wherein adjusting at least one operating parameter of the air conditioning system comprises adjusting a speed of the compressor.

16. The air conditioning system of claim 1, wherein the air conditioning system further comprises an outdoor fan for urging a flow of air through the outdoor heat exchanger, and wherein adjusting at least one operating parameter of the air conditioning system comprises controlling a speed of the outdoor fan.

17. The air conditioning system of claim 1, wherein the air conditioning system further comprises an indoor fan for urging a flow of air through the indoor heat exchanger and the reheat heat exchanger, and wherein adjusting at least one operating parameter of the air conditioning system comprises controlling a speed of the indoor fan.

18. The air conditioning system of claim 1, wherein the air conditioning system further comprises an expansion valve for throttling refrigerant, and wherein adjusting at least one operating parameter of the air conditioning system comprises adjusting the electronic expansion valve.

19. A method of regulating the operation of an air conditioning system, the air conditioning system comprising an outdoor heat exchanger positioned within an outdoor portion, a reheat heat exchanger positioned within an indoor portion, and an indoor heat exchanger positioned within the indoor portion, the method comprising:
obtaining a reheat coil saturation temperature using a reheat temperature sensor positioned proximate an upstream end of the reheat heat exchanger in a cooling mode;
obtaining an outdoor coil vapor temperature using an outdoor vapor temperature sensor positioned proximate an upstream end of the outdoor heat exchanger in the cooling mode;
obtaining an indoor coil vapor temperature using an indoor vapor temperature sensor positioned between the upstream end of the reheat heat exchanger and a downstream end of the indoor heat exchanger in the cooling mode; and
selectively operating a compressor, an electronic expansion valve, an indoor fan, or an outdoor fan in response to the reheat coil saturation temperature, the outdoor coil vapor temperature, and the indoor coil vapor temperature.

20. The method of claim 19, further comprising:
obtaining an outdoor coil saturation temperature using an outdoor saturation temperature sensor positioned between an upstream end and a downstream end of the outdoor heat exchanger in the cooling mode;
obtaining an indoor coil saturation temperature using an indoor saturation temperature sensor positioned proximate an upstream end of the indoor heat exchanger in the cooling mode; and
selectively operating the compressor, the electronic expansion valve, the indoor fan, or the outdoor fan in response to the outdoor coil saturation temperature and the indoor coil saturation temperature.

\* \* \* \* \*